United States Patent [19]

Nonogawa et al.

[11] Patent Number: 5,174,260
[45] Date of Patent: Dec. 29, 1992

[54] INTAKE PORT STRUCTURE FOR MULTI VALVE ENGINE

[75] Inventors: Kenichi Nonogawa; Mamoru Kaneko, both of Iwata, Japan

[73] Assignee: Yamaha Hatsudoki Kabushiki Kaisha, Iwata, Japan

[21] Appl. No.: 805,317

[22] Filed: Dec. 10, 1991

[30] Foreign Application Priority Data

Feb. 15, 1991 [JP] Japan .................................. 3-44310

[51] Int. Cl.$^5$ ............................................. F02B 15/00
[52] U.S. Cl. .................................. 123/432; 123/52 M; 123/188.8
[58] Field of Search ................. 123/432, 188 M, 52 M

[56] References Cited

U.S. PATENT DOCUMENTS

| | | | |
|---|---|---|---|
| 4,538,574 | 9/1985 | Lombardi | 123/432 |
| 4,548,175 | 10/1985 | Kawai et al. | 123/432 |
| 4,614,174 | 9/1986 | Tanigawa et al. | 123/432 |
| 4,627,400 | 12/1986 | Takata et al. | 123/432 |
| 4,667,365 | 5/1987 | Oishi et al. | 123/432 |
| 4,671,234 | 6/1987 | Tegtmeier | 123/432 |
| 4,683,855 | 8/1987 | Laimbock | 123/432 |
| 4,726,343 | 2/1988 | Kruger | 123/432 |
| 4,766,866 | 8/1988 | Takii et al. | 123/432 |
| 4,877,004 | 10/1989 | Nishizawa | 123/432 |
| 4,955,347 | 9/1990 | Toyoda | 123/432 |
| 4,971,008 | 11/1990 | Morishita | 123/432 |
| 5,009,200 | 4/1991 | van Basshuysen et al. | 123/432 |

*Primary Examiner*—E. Rollins Cross
*Assistant Examiner*—Erick Solis
*Attorney, Agent, or Firm*—Ernest A. Beutler

[57] ABSTRACT

A cylinder head intake porting system for a three intake valve internal combustion engine wherein a staged induction system is employed and mid-range torque is improved by communicating separate intake passages with each other. Both carbureted and fuel injected embodiments are shown.

25 Claims, 9 Drawing Sheets

INTAKE PORT STRUCTURE FOR MULTI VALVE ENGINE

BACKGROUND OF THE INVENTION

This invention relates to an intake port structure for a multi valve engine and more particularly to an improved induction system for a multi valve engine.

It is acknowledged that the performance of an internal combustion engine can be improved, particularly at high speeds, by the use of multiple intake valves. Although four valve per cylinder engines are quite common, there are a number of advantages of employing five valve per cylinder with three intake valves. The excellent breathing capacity of a five valve engine is well acknowledged. However, because of the good breathing capacity of five valve engines, these engines may have a tendency to have poor performance at low and mid-range speeds. The reason for this is that the flow velocity through the three intake passages under these running conditions is extremely low and poor combustion and fuel vaporization can result. It has been, therefore, been proposed to provide some staging system so that the effective intake area of the engine is reduced when operating at low and mid-range speeds.

Although such staging systems significantly improve the performance of the engine at low speeds, they do give rise to some difficulties. For example, if the staging is accomplished by providing a throttle valve in each intake passage, then the cylinder head porting configuration and throttle valve arrangement can become complicated. If, on the other hand, two of the intake passages are siamesed and the third is left separate and a throttle valve is provided only the siamesed passage, it has been noted that mid-range performance can deteriorate. That is, it has been found with such an arrangement that there may be a dip in the torque curve of the engine at midrange. Since this is a commonly operated speed range for the engine, such an arrangement may not be acceptable.

It has been discovered, however, that this problem with midrange performance can be overcome by providing at least some communication between the intake ports even though they are basically separated. However, this can present some problems in connection with the forming of the interconnecting passageway and keeping it close to the intake valve seats, where it is most effective.

It is, therefore, a principal object of this invention to provide an improved porting arrangement for an engine having at least three intake valves.

It is a further object of this invention to provide an improved porting arrangement for an engine having at least three intake valves.

It is a further object of this invention to provide an improved porting arrangement for an engine having at least three intake valves wherein the port openings are all formed in the cylinder head and can communicate with each other through a passageway formed close to the valve seats.

In addition to the porting considerations previously described, the use of multiple intake valves, particularly if staging is employed, can give rise to certain difficulties in connection with the associated charge forming system. Specifically, if fuel injection and specifically port fuel injection is employed and a staged induction system is also incorporated, then it is very difficult to utilize a single fuel injector for spraying fuel into all of the intake passages. This can present some problems even if staging is not employed because it is difficult to position an injector and have its spray nozzle in such an orientation to insure that a uniform mixture is supplied to the combustion chamber under all running conditions. Alternatively, even if stratification is desired, the mixture allocation within the combustion chamber can be difficult.

It is, therefore, a still further object of this invention to provide an improved fuel injection system for an internal combustion engine having multiple intake ports.

It is a further object of this invention to provide an improved staged induction system for a multi valve engine embodying fuel injectors.

SUMMARY OF THE INVENTION

A first feature of this invention is adapted to be embodied in an intake port arrangement for a cylinder head of an internal combustion engine. The cylinder head defines a combustion chamber and at least three intake valve seats in the combustion chamber. A pair of separate inlet openings are formed in an outer surface of the cylinder head and first and second intake passages formed in the cylinder head extend from respective of the inlet openings to one of the valve seats and the other two valve seats, respectively. In accordance with the invention, means communicate the intake passages with each other adjacent the valve seats.

Yet another feature of the invention is adapted to be embodied in an intake port arrangement for the cylinder head of an internal combustion engine which defines a combustion chamber and at least three intake valves seats in the combustion chamber. A first intake passage is formed in the cylinder head and terminates at a first of the valve seats and a second intake passage is formed in the cylinder head and terminates at the second and third valve seats. A first fuel injector sprays fuel into the first intake passage and a second fuel injector sprays fuel into the second intake passage.

DETAILED DESCRIPTION OF THE PREFERRED EMBODIMENTS OF THE INVENTION

Figure 1:
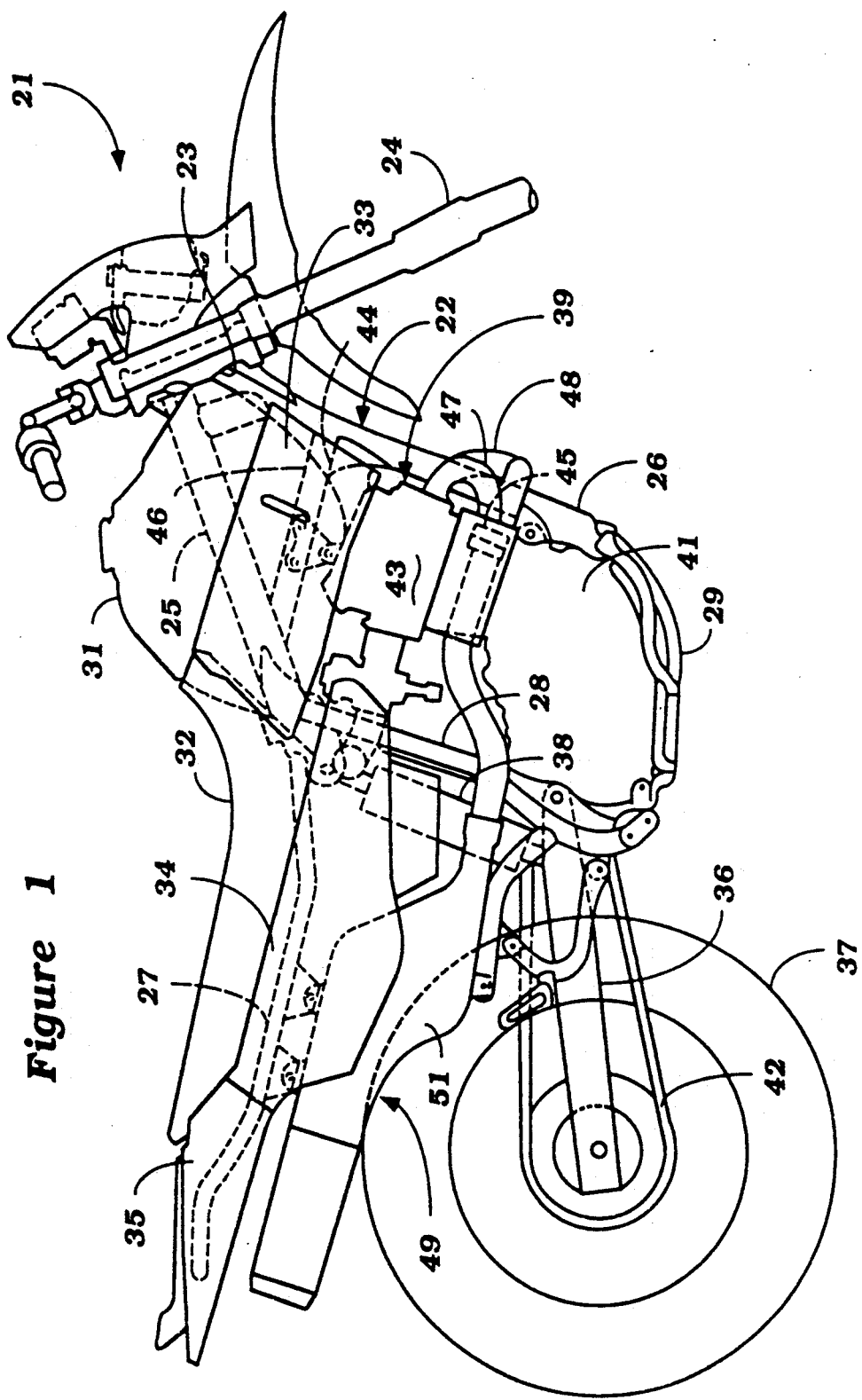
FIG. 1 is a partial side elevational view of a motorcycle powered by an internal combustion engine constructed in accordance with a first embodiment of the invention.

Referring first to FIG. 1, a motorcycle powered by an internal combustion engine constructed in accordance with an embodiment of the invention is identified generally by the reference numeral 21. The invention is described in conjunction with a motorcycle since it has particular utility in conjunction with such this type of vehicle. It is to be understood, however, that certain facets of the invention may be utilized in conjunction with internal combustion engines that power other types of vehicles or, for that matter, other applications for internal combustion engines.

The motorcycle 21 includes a welded frame assembly 22 having a head pipe 23 that journals a front fork 24 for steering movement. A front wheel (not shown) is journaled by the front fork 24 in a known manner.

The frame 22 further includes a main frame tube 25, a down tube 26, a seat rail 27 and a seat pillar 28. At the lower end of the frame, an underguard 29 spans the down tube 26 and the seat pillar 28.

A fuel tank 31 is positioned behind the head pipe 23 and ahead of a seat 32 that is carried by the seat rail 27. A small body assembly comprised of a side cover for the tank 31 and air scoop 33, a side covering for the lower portion of the seat 34 and a rear cover 35 are suitably affixed to the frame 22.

A trailing arm 36 suspends a rear wheel 37 from the frame assembly in a suitable manner, including a combined spring shock absorber 38 that lies generally on the longitudinal center plane of the motorcycle 21.

The rear wheel 37 is powered by an engine unit 39 which is comprised of a water cooled, single cylinder, four cycle, five valve, single overhead cam engine. A crankcase assembly 41 of the engine unit 39 contains a change speed transmission which is driven by the engine crankshaft and which drives the rear wheel 37 through a chain 42. Although the details of the engine unit 39 and specifically the engine portion of it will be described by references to the remaining figures, the engine unit 39 includes a cylinder head 43, a cam cover 44 and a cylinder block 45 in addition to the crankcase 41. This engine unit is mounted in the frame 22 with the cylinder block 45 inclined slightly forward in a suitable manner by means including a support pipe 46 that is positioned beneath the main pipe 25 and which is joined to the main pipe 25 and the down tube 26.

As will become apparent, the engine unit 39 has a pair of forwardly facing exhaust ports from which a pair of exhaust pipes 47 and 48 extend into an exhaust system, indicated generally by the reference numeral 49 and which includes a side mounted muffler 51.

The engine unit 39 also includes an induction system including an air box which is not shown in FIG. 1 that supplies air to a pair of carburetors which serve three rearwardly facing exhaust ports, as will be described by reference to the remaining figures. The induction system (FIG. 5) includes a primary induction system 52 including a primary carburetor 53 and a secondary system 54 including a secondary carburetor 55. Both carburetors 53 and 55 draw air from the aforenoted air box. The configuration of the components is such that the exhaust pipes 47 and 48 extends on opposite sides of the down tube 26 while the air box encircles the spring shock absorber unit 38 so as to provide a very compact assembly and yet one which will not interfere with the basic construction of the motorcycle or adversely affect the design of the engine.

Figure 3:
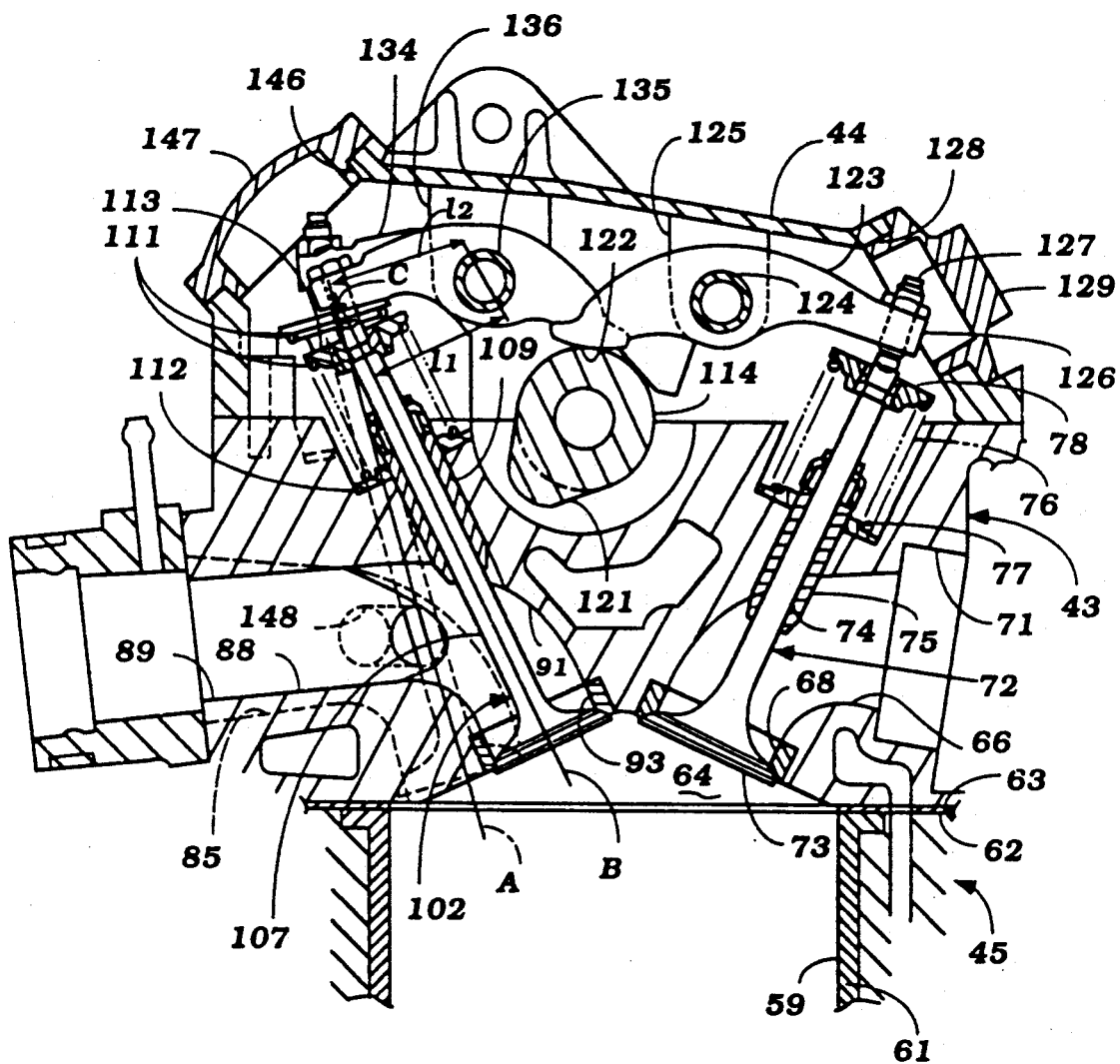
FIG. 3 is a cross sectional view of the complete cylinder head assembly and a portion of the associated cylinder block taken along the line 3—3 of FIG. 2.
Figure 4:
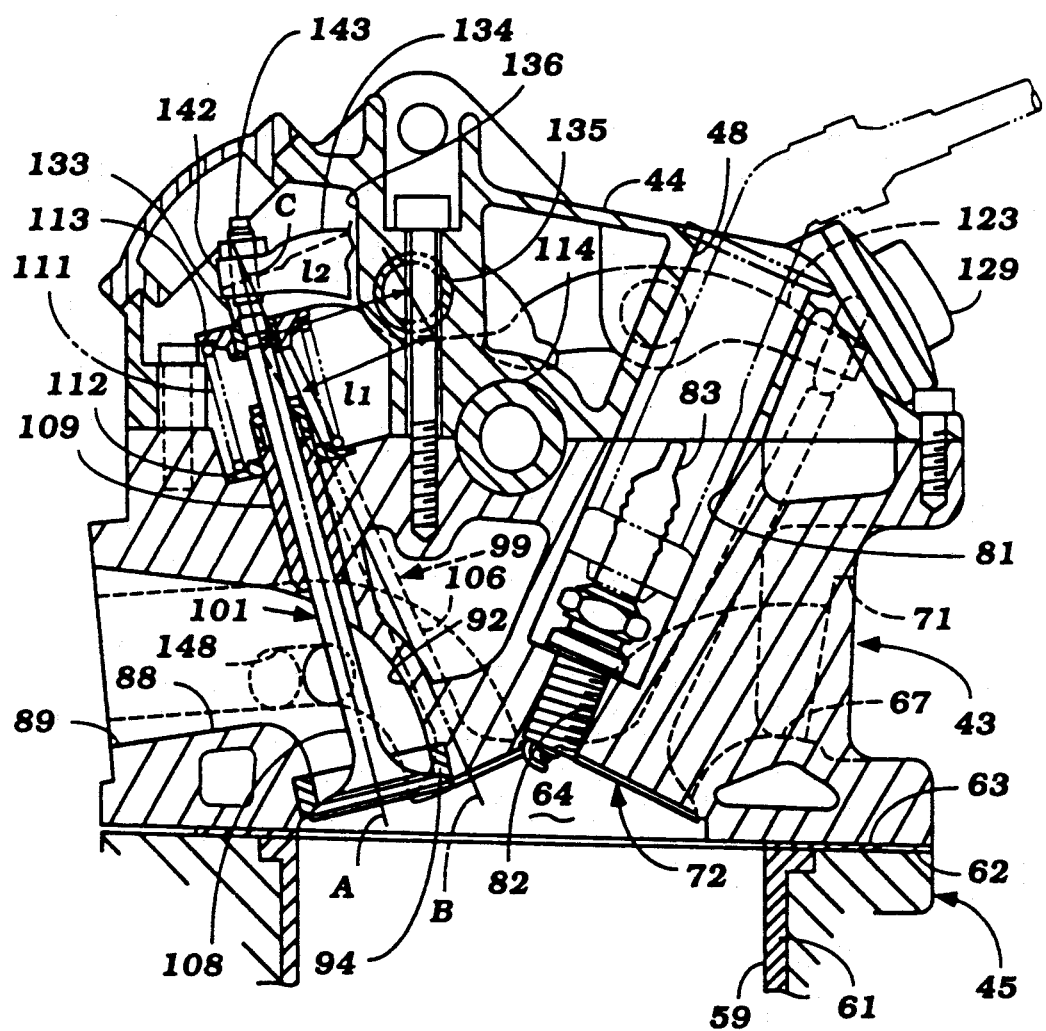
FIG. 4 is a cross sectional view taken along the line 4—4 of FIG. 2.

Referring now to FIGS. 3 and 4, it will be noted that the cylinder block 45 is formed with a cylinder bore 59 which is formed by a pressed or cast in liner 61. A piston (not shown) reciprocates within the cylinder bore 59 and drives the crankshaft (not shown) contained within the crankcase 41 in a well known manner. Since the invention deals primarily with the cylinder head 43 and valve train associated with it, those components of the engine which are considered to be conventional have not been illustrated and further description of them is not believed to be necessary to enable those skilled in the art to practice the invention.

The cylinder head 43 has a lower surface 62 that is sealingly engaged with a head gasket 63 so as to provide a seal with the cylinder block 45 around the cylinder bore 59. In addition, the cylinder head 43 is formed with a generally central recess 64 which recess is defined by a surface 65 surrounded by the lower cylinder head surface 62. This recess has a generally spherical configuration although it assumes a pent roof type of configuration as may be best seen in FIGS. 3 and 4.

Referring now primarily to FIGS. 2 through 5, the cylinder head 43 is formed with a pair of forwardly facing exhaust passages 66 and 67 each of which extends from the combustion chamber 63 through a valve seat 68 formed by a pressed in insert 69. These exhaust passages 66 and 67 terminate in forwardly facing exhaust ports 71 to which the respective exhaust pipes 47 and 48 are affixed in a suitable manner.

A pair of exhaust valves 72 each of which has a head portion 73 and a stem portion 74 are slideably supported for reciprocation within the cylinder head 43 by a respective pressed in valve guide 75. The exhaust valves 72 reciprocate within a common plane that is inclined at an acute angle to a plane containing the axis D (FIG. 2) of the cylinder bore 59. The axes of reciprocation also lie in planes that are parallel to each other and to the cylinder bore axis D. This facilitates operation of the valve although they may be slightly inclined if desired. The exhaust valves 72 are urged to their closed positions by means of respective coil compression springs 76 that engage wear plates 77 bearing against the cylinder head 43 and keeper retainer assemblies 78 affixed in a known manner to the upper ends of the exhaust valve stems 74. The exhaust valves 72 are opened in a manner which will be described.

It should be noted that the exhaust passages 66 and 67 are disposed at an angle to the plane containing the cylinder bore axis D and thus diverge from a plane perpendicular to this plane and also passing through the cylinder bore axis D. This permits the exhaust pipes 47 and 48 to clear the down tube 26 and also provides a better and less flow resistant path for the entire exhaust system.

A spark plug well 81 is formed in the cylinder head 43 between the exhaust passages 66 and 67 and terminates at a threaded opening 82 in which a spark plug 83 is received. The spark plug 83 is disposed so that its gap lies substantially o the cylinder bore axis D. A corresponding well 84 is formed in the cam cover 44 so as to facilitate insertion and removal of the spark plug 83 without removing the cam cover 44. The spark plug 83 is fired by a suitable ignition system.

A primary intake passage 85 extends through the opposite side of the cylinder head 43 from the exhaust side already described. The passage 85 extends from an intake port 86 formed in the side of the cylinder head 43 and terminates at a valve seat 87 formed by a pressed in insert. As may be best seen in FIG. 5, the primary intake passage 85 has a central axis that is generally perpendicular to the aforenoted plane containing the cylinder bore axis D and hence as a relatively short length from its intake port 86 to its valve seat 87. As a result, good, low and mid range performance and good response may be achieved. This passage 85 and its central axis is disposed at a distance from a plane which plane contains the axis of the cylinder bore D and is perpendicular to the aforenoted plane. The significance of this will be as described.

A siamese type secondary intake passage 88 extends from an intake port 89 formed in the intake side of the cylinder head 43 and branches into a pair of passages 91 and 92 each of which terminates at a respective valve seat comprised of a center valve seat 93 and a side valve seat 94. The center of the intake port 89 as extended by a spacer, to be described, is disposed at a distance from the plane which distance is the same as the distance of the primary intake port 86. The carburetors 53 and 55 are affixed to these respective intake ports 86 and 89 through the intermediary of respective spacers 95 and 96 (FIG. 5) which have respective passage ways 97 and 98 that form extensions of the cylinder head intake passages 85 and 88. By utilizing the spacers it is possible to have this equal distance between the centers of the ports even though the actual port 89 is closer to the perpendicular plane than is the inlet of the passage 98 and its spacer. This construction permits the induction system to clear the shock absorber and spring assembly 38 and avoids interference between the carburetors 53 and 55.

A central effective line or bisector of the secondary intake passage 88 lies at an acute angle to the perpendicular plane while the portion 92 extends generally perpendicularly to the plane containing the axis of the cylinder bore D as aforenoted.

The carburetor 53 is sized and jetted and has a throttle valve (not shown) that functions to control both the low speed and mid range performance of the engine as well as the high speed performance. The throttle valve (not shown) of the carburetor 55 is operated in a staged sequence with the carburetor of the throttle valve 53 and the carburetor 55 may only have high speed circuits since this carburetor supplies the fuel air charge only to the engine under high speed operation. Either a staged linkage system or some form of load or speed responsive control (such as a vacuum responsive servo motor) can be employed for operating the throttle valve of the carburetor 55 in this staged sequence.

Figure 6:
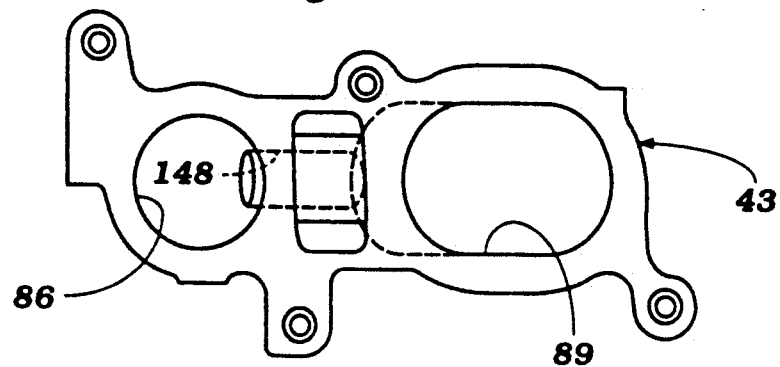
FIG. 6 is a side elevational view of the cylinder head looking in the direction of the arrow 6 in FIG. 1 and showing the induction manifold removed.
Figure 7:
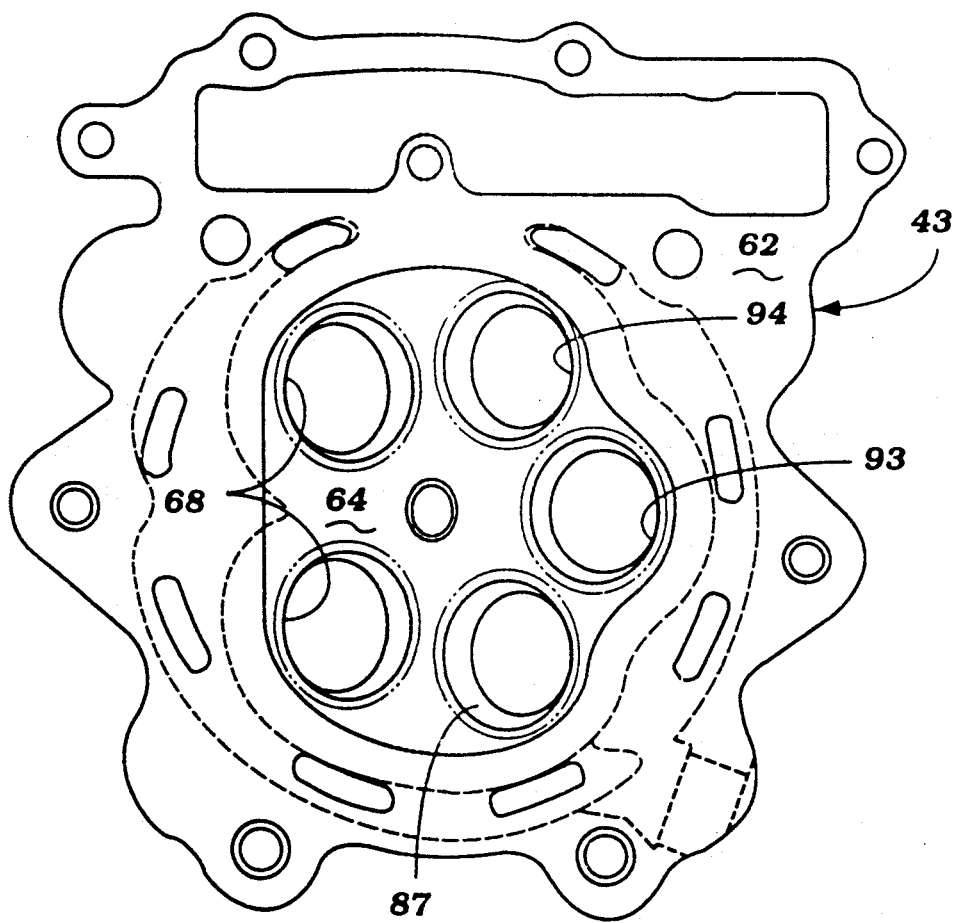
FIG. 7 is a bottom plan view of the cylinder head with the valves removed.
Figure 8:
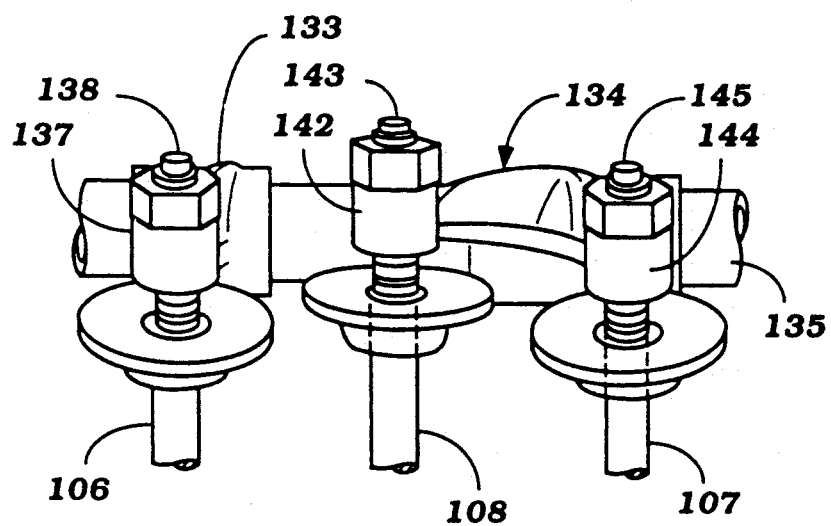
FIG. 8 is an enlarged side elevational view showing the relationship between the intake rocker arms and the upper ends of the intake valve stems.

First, second and third poppet type intake valves 99, 101 and 102 have respective head portions 103, 104 and 105 which cooperate with the valve seats 87, 93 and 94 for controlling the flow through them. The intake valves 99 and 102 are side valves and have their respective stem portions 106 and 107 slidable supported in guides, to be described, for reciprocation about axes B which are in a common plane disposed at an acute angle (FIG. 6) to the plane containing the cylinder bore axis D which acute angle may be substantially the same as the acute angle of reciprocation of the exhaust valves 72. The center exhaust valve 101 has its stem portion 108 supported for reciprocation about an axis A which is disposed also at an acute angle (FIG. 6) to the aforenoted plane containing the cylinder bore axis D but which acute angle is lesser than the angle of reciprocation B of the valves 99 and 101. The angular disposition of the reciprocal axes A and B is such that these axes intersect a line C which is parallel to the plane containing the cylinder bore axis D but which is spaced from the tips of the individual intake valves 99, 101 and 102. As a result of this, the angular configuration of the side valves 99 and 102 relative to the center valve 101 is relatively small. This configuration permits the adjacent area between the intake valves to be relatively smooth and thus provide a smooth combustion chamber configuration that will avoid hot spots and still permit a generally spherical configuration.

The axes A and B of reciprocation of the intake valves 101 and 99 and 102 all lie in parallel planes which planes are parallel to the axis of the cylinder bore D. This permits ease of operation. However, if desired, these axes may be slightly skewed from parallel planes as is also possible with the exhaust valves 72, as previously noted.

The valve guides that slidable support the stems 106, 107 and 108 of the intake valves 99, 102 and 101 are each indicated by the reference numeral 109. Intake valve springs 111 engage bearing plates 112 that bear against the cylinder head 43 and keeper retainer assemblies 113 affixed to the upper ends of the respective valve stems for urging the intake valves 99, 101 and 102 to their closed positions. The intake valves 99, 101 and 102 are operated by means of rocker arm assemblies to be described.

Figure 2:
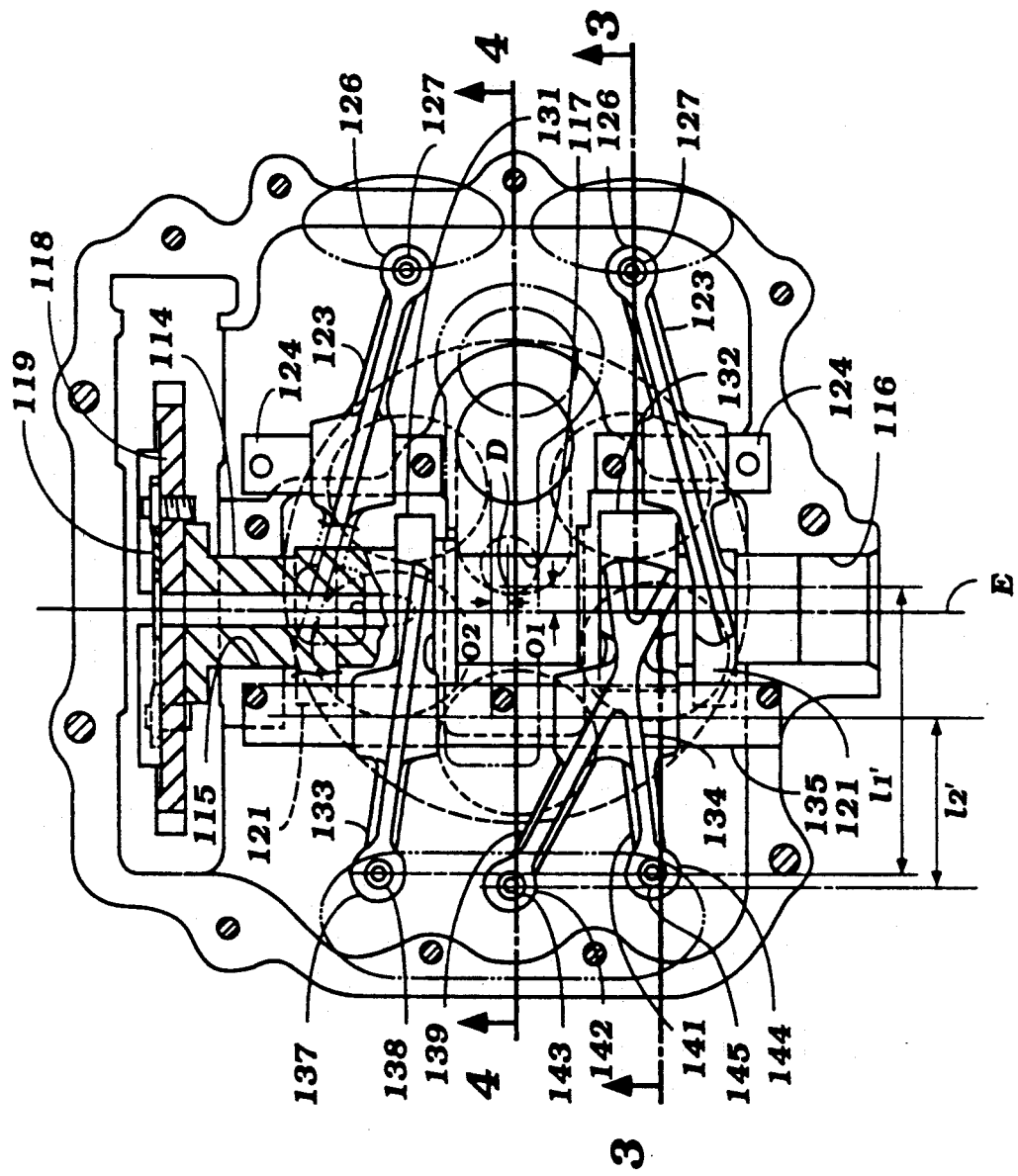
FIG. 2 is a top plan view, with portions broken away, showing the cylinder head assembly of the engine, with the cam cover removed and with portions shown in section.

The exhaust valves 72 and intake valves 99, 101 and 102 are all operated by means of a single overhead camshaft 114. The camshaft 114 is journaled, in a manner to be described, for rotation about an axis E which is offset to the intake side of the cylinder head from the cylinder bore axis D by a distance 01 (FIG. 2). The axis E is parallel to the plane aforementioned that contains the axis of the cylinder bore D. The camshaft 114 has enOd bearing surfaces that are journaled in bearing surfaces 115 and 116 formed by the cylinder head 43 and corresponding bearing surfaces formed by the cam cover 44. In addition, there is provided a central bearing surface on the camshaft 114 that is journaled by a bearing surface 117 formed in the cylinder head 43. A corresponding bearing surface is partially formed in the cam cover 44 and has its center offset a distance 02 from the cylinder bore axis D so as to provide clearance for other components of the cylinder head assembly to be described and specifically one of the rocker arms.

The camshaft 114 is driven from the engine crankshaft by means of a drive chain (not shown) and sprocket 118 that is affixed to one end of the camshaft. A decompression device 119 is associated with the sprocket 118 and serves to reduce the starting torque on the engine by lifting slightly one of the exhaust valves 72 during starting operation.

A pair of exhaust cam lobes 121 are formed at the outer ends of the camshaft 114 adjacent the bearings that engage the cylinder head bearing surfaces 115 and 116. These cam lobes 121 are engaged by follower surfaces 122 of exhaust rocker arms 123. These exhaust rocker arms 123 are journaled on stub rocker arm shafts 124 each of which is supported by a respective boss 125 formed on the inner surface of the cam cover 44.

The outer ends of the rocker arms 123 are provided with taped portions 126 that receive adjusting screws 127 for providing lash adjustment between the exhaust rocker arms 123 and he tips of the stems 74 of the exhaust valves 72 for clearance adjustment. Access openings 128 are provided in the cam cover 44 for facilitating valve adjustment without removal of the cam cover 44. These access openings 128 are normally closed by closure plugs 129 which are affixed in place in a suitable manner.

In addition to the exhaust cam lobes 121, the camshaft 114 is provided with a first intake cam lobe 131 and a second intake cam lobe 132 which lobes 131 and 132 are disposed on opposite sides of the central camshaft bearing surface which is journaled in the cylinder head bearing surface 117. The cam lobes 131 and 132 cooperate with respective rocker arms 133 and 134 for opening the intake valves 99, 101 and 102, respectively, in a manner to be described. The rocker arms 133 and 134 are both journaled on a single rocker arm shaft 135 that is journaled within the bearing surfaces formed by lugs 136 of the cam cover 44. These lugs 136 also form the bearing surfaces which cooperate with the cylinder head bearing surfaces 115, 116 and 117 for journaling the camshaft 114.

It has already been noted that the intake valves 99 and 102 reciprocate about respective reciprocal axes B and the intake valve 101 reciprocates about the axis A. As has been noted that the axes A and B intersect at a line C which is parallel to the aforenoted plane containing the cylinder bore axis D which point C is spaced from the tips of all of the intake valves. The center intake valve 101 has its tip spaced outwardly in a horizontal direction a greater distance 12' than the tips of the side intake valves 99 and 102 which valves lie at the distance 11' from the plane and also from the pivotally axes of the respective rocker arms 133 and 134. Also, it should be noted that the center intake valve 101 and specifically its axis B is at a perpendicular distance 11 from the rocker arm shaft 113 whereas the axes of reciprocation A of the other intake valves is a perpendicular distance 12 from this axis. This distance 11 is less than the distance 12. These differences in distance permit the smooth combustion chamber configuration previously noted and also permit a variation in the amount of lift for the two valves operated from the same cam lobe and same rocker arm, this being the cam lobe 132 and rocker arm 134 in this embodiment. As a result of the greater distance to the center intake valve 101 than the side intake valves 99 and 102 a greater amount of lift may be achieved for this valve than the other two. As a result, there can be generated more air flow through the center intake passage than the side intake passages. Although the tip of the center intake valves 101 is spaced different distances from the tips of the side intake valves 99 and 102 from the rocker arm axis E and also from the cylinder bore axis D, the tips of all of the stems of the intake valves 99, 101 and 102 lie at substantially the same vertical distance above the cylinder head sealing surface 62 and lie in a common plane with the pivot axis of the rocker arms 133 and 134. This is done so as to reduce the overall height of the cylinder head assembly and of the engine, as will be described.

Rocker arm 133 has an enlarged taped portion 137 that receives an adjusting screw 138 that cooperates with the tip of the stem 106 of the intake valve 99 that is associated with the primary intake passage 85. As has been previously noted, the intake passage 85 is designed primarily to accommodate low and mid range performance and hence the cam lobe 131 may be configured to provide a lift characteristic that is better tuned for low speed performance.

The rocker arm 134 has a pair of bifurcated arms 139 and 141 with the arm 139 having a threaded end 142 that receives an adjusting screw 143 that cooperates with the tip of the stem 108 of the center intake valve 101. The arm 141 has an enlarged taped portion 144 that receives an adjusting screw 145 that cooperates with the tip of the valve stem 107 of the intake valve 102 for clearance adjustment.

The cam cover 44 is provided with elongated opening 146 for accessing each of the adjusting screws 138, 143 and 145 so that the valve adjustment may be made without removing the cam cover. A removal closure plug 147 normally closes the opening 146 and is removed for servicing.

The cam lobe 132 associated with the rocker arm assembly 134 is configured so as to provide a greater degree of lift for both of the valves and also a longer event. This is because the rocker arm 134 is associated with the secondary or high speed intake passage 88 of the cylinder head 43. As has also be noted, due to the difference in length of the arms 139 and 141 the center intake valve 101 may have an even greater lift than the side intake valve 102. This configuration may be done so as to improve or generate swirl in the combustion chamber. Of course and as has been previously noted, those designers in the art may incorporate these features to provide different types of valve operation and different types of tuning.

Figure 5:
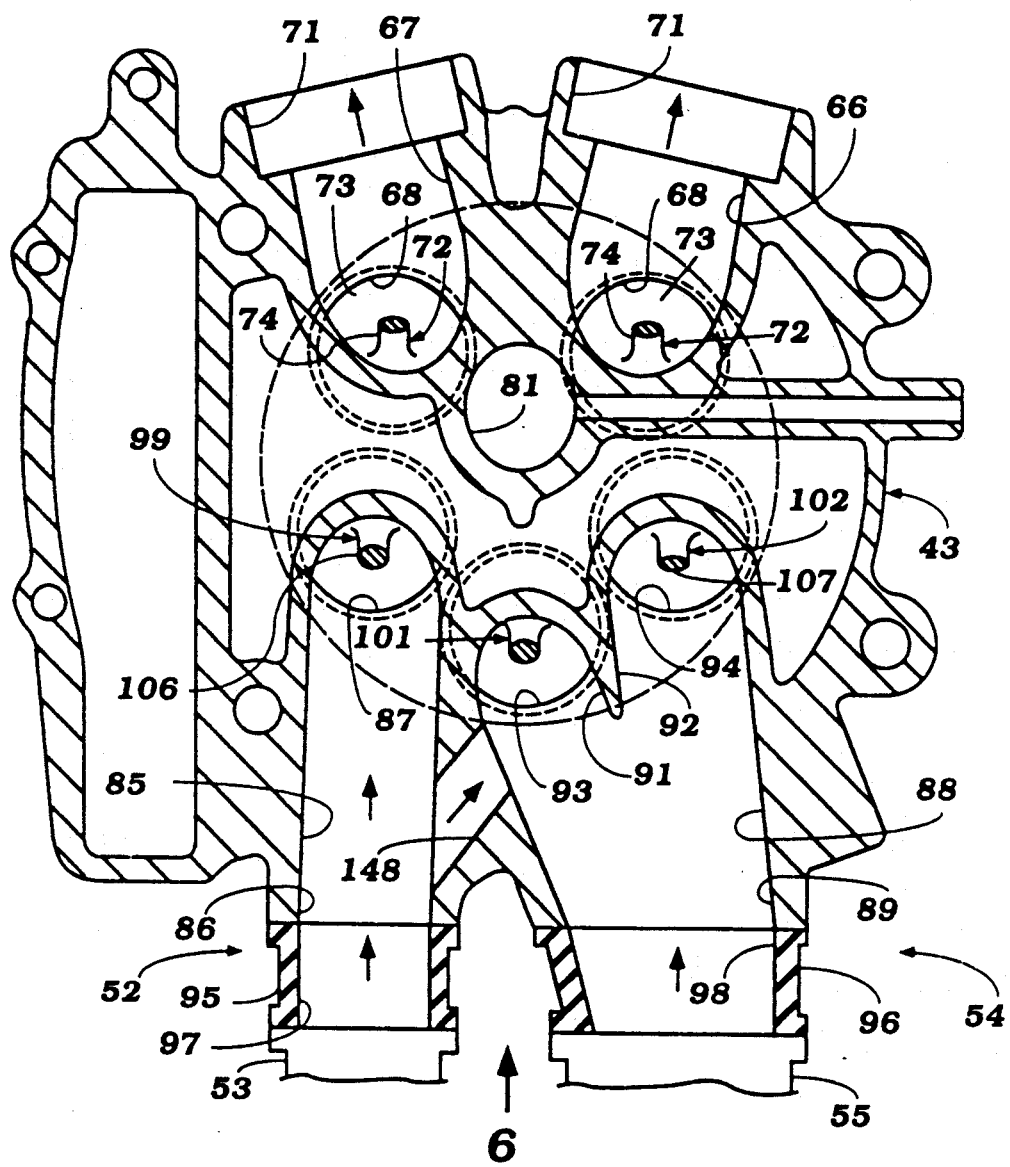
FIG. 5 is a cross sectional view of the cylinder head taken through the intake and exhaust ports to show the configuration of their passages.

Although the use of the primary and secondary intake passages 85 and 88 permit a good volumetric efficiency for high speed running as well as good turbulence and combustion at low speed running due to the use of only the primary intake passage 87 under this condition, it has been found that when the passages 85 and 86 do not communicate with each other, there may be some fall off in mid-range torque. To avoid this disadvantage, there is provide an interconnecting passageway 148 (FIGS. 3, 4 and 5), which is generally a cylindrical passageway that extends between the primary intake passage 85 and the secondary intake passage 88 and specifically the portion 91 thereof. The passageway 148 is disposed at an acute angle as shown in FIG. 5 to a plane perpendicular to the plane containing the cylinder bore axis D so that the flow will be directed toward the passage 88 from the passage 85 and specifically toward the center intake valve 101. This construction has been found to improve midrange performance and also to insure that there will not be any stratification of the fuel air charge when operating at high speed high load conditions. The passageway 148 can be conveniently formed within the cylinder head 43 and is located so that it may be formed by drilling through the port opening 86, as should be readily apparent from FIG. 5. As a result, this passageway 148 can be positioned close to the valve seats 87 and 93 where it has been found to provide the greatest improvement in mid-range performance.

Therefore, the interconnecting passageway 148 not only improves mid-range performance but improves high speed performance due to the more homogeneous fuel air mixture that will be charged in the combustion chamber due to the incorporation of this passageway.

Figure 9:
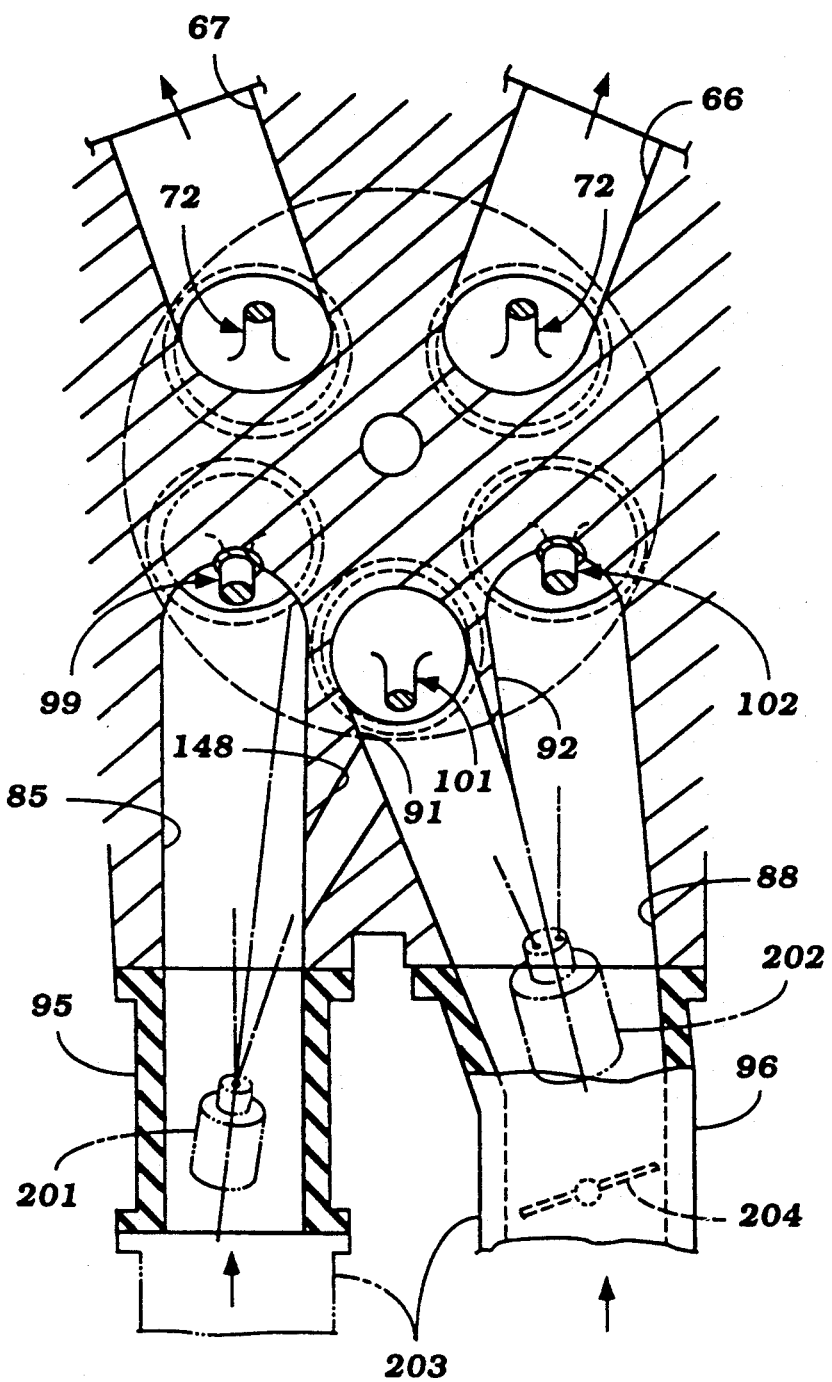
FIG. 9 is a cross sectional view, in part similar to FIG. 5 and shows another embodiment of the invention.

In the embodiment of the invention as thus far described (FIGS. 1 through 8) the charge forming system has been comprised of a pair of primary and secondary carburetors. However, the invention can also be utilized with great efficiency in connection with fuel injection engines and FIG. 9 shows such an embodiment. Except for the incorporation of fuel injectors, the construction of the cylinder head and valves of this embodiment is the same as the embodiment of FIGS. 1 through 8 and, for that reason, only a single figure is believed to be necessary to show the construction and operation of this embodiment.

In this embodiment, a first or primary fuel injector 201 is positioned either in the spacer 95 or the cylinder 43, the spacer mounting being illustrated. A secondary fuel injector 202 is mounted in the spacer 96, but also may be mounted in the cylinder head if so desired. A common air ducting system, indicated generally by the reference numeral 203 in which a manually operated primary throttle valve (not shown) is positioned supplies air to the spacers 95 and 96. A secondary throttle valve 204 is positioned in the spacer 96 and is operated in a staged sequence, like the throttle valve of the carburetor 55 of the previously described embodiment. As a result, the flow for primary running under low speed low load conditions will be primarily through the primary intake passage 85 since the throttle valve 204 will be closed in this position.

It should be noted that the primary fuel injector 201 is disposed so that a portion of its spray will be directed toward the passage 148 and, accordingly, the center intake valve 101. This will provide more equal flow distribution but does not necessitate the supply of any significant amount of fuel to the secondary intake passage portion 92. Therefore, some minimal amount of stratification may be achieved, if desired. Also, as has been noted, the center intake valve 101 has a greater lift so that this will also facilitate some fuel entry through the intake valve 101 when it is opened.

The amount of fuel controlled by the fuel injector 201 can be determined by the sensing of the position of the main throttle valve which, has been noted, is not shown. The secondary fuel injector 202 may have its amount of fuel controlled by either the position of the secondary throttle valve 204 or engine speed or a combination of them. As a result of this construction, good fuel distribution and maximum performance can be achieved under all running conditions.

Figure 10:
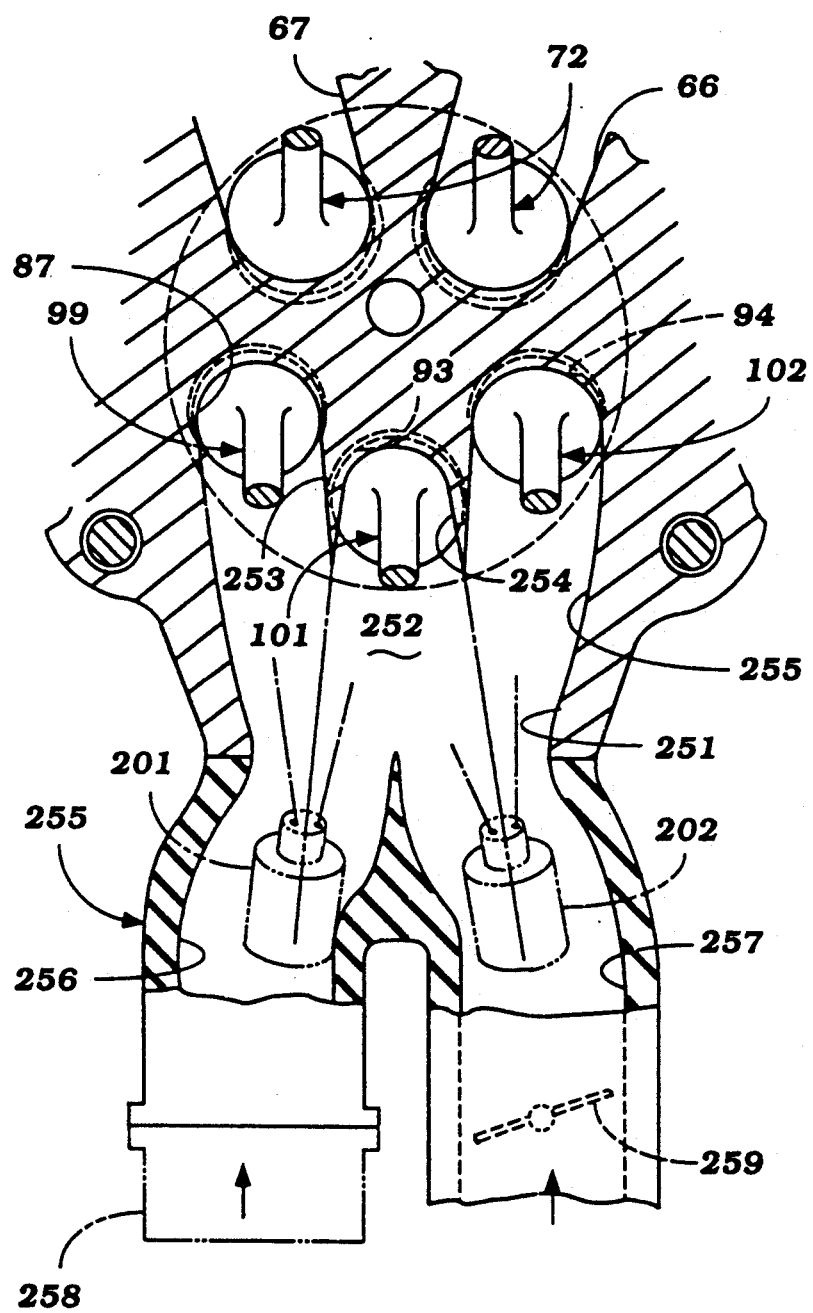
FIG. 10 is a cross sectional view, in part similar to FIGS. 5 and 9, and shows yet another embodiment of the invention.

In the embodiments of the invention as thus far described, the primary and secondary intake passages 85 and 88 and the interconnecting passageway 148 have all been formed in the cylinder head. FIG. 10 shows another embodiment of the invention which achieves some of the advantages of the previously described embodiments but which has a simpler porting arrangement for the cylinder head. Again, the basic construction of the cylinder head, valves, valve seats, etc is the same as the previously described embodiments and, for that reason, those components which are same have been identified by the same reference numerals and further description of these common components is not believed to be necessary to enable those skilled in the art to understand the construction and operation of this embodiment.

In this embodiment, the intake side of the cylinder head is formed with a single relatively large intake opening 251 that serves a single passage 252 that is divided into three portions 253, 254 and 255 at their outlet ends which communicate with the valve seats 87, 93 and 94, respectively. The passages 252 are divided into primary and secondary supply sides by a bifurcated spacer assembly, indicated generally by the reference numeral 255 which has a primary runner 256 and a secondary runner 257. The primary and secondary runners 256 and 257 receive air from a common air force 258 in which a primary throttle valve (not (shown) is positioned. A secondary valve 259 is positioned in the secondary passage 257 and is controlled in a staged sequence as with the secondary carburetor 55 of the embodiment of FIGS. 1 through 8, and the secondary throttle valve 254 of the embodiment of FIG. 9. A primary fuel injector 201 is disposed in the primary passage 256 and a secondary fuel injector 202 is positioned in the secondary passage 257. The primary and secondary fuel injectors 201 and 202, respectively, are controlled by a strategy similar to that described in conjunction with the embodiment of FIG. 9.

In the embodiments of FIGS. 9 and 10, the strategy is, as previously noted, that the secondary fuel injector 202 does not supply fuel until the mid-range performance of the engine when the throttle valves 204 and 259, respectively are open. However, once these throttle valves are open then the proportion of fuel from the injectors 201 and 202 is controlled so that each injector supplies fuel. At the lower portion of the mid-range, when the injector 201 is supplying a lesser amount of fuel the ratio of fuel supplied between the injectors 201 and 202 is varied and a different ratio is employed with the embodiment of FIG. 9 than with the embodiment of FIG. 10 due to the fact that the embodiment of FIG. 9 has limited communication between the passageways 85 and 88 while the embodiment of FIG. 10 has a common passageway 252.

Referring specifically to the embodiment of FIG. 9, when the engine is operating at the low end of the high speed high load range, the ratio of fuel supplied between the injectors 201 and 202 is in the range of one to two in quantity That is, when the injector 201 is supplying a minimum of amount of fuel Q1 the amount of fuel supplied by the injector 202 (Q2) equals twice the quantity $$Q1 \frac{Q1}{Q2} = \frac{1.0}{2.0} .$$

However, when running at maximum output and the injector 201 is supplying maximum fuel, the ratio is $$\frac{Q1}{Q2} = \frac{1.2}{1.8} .$$

The reason for this difference in ratio is that some fuel from the injector 201 will flow through the passageway 148 through the valve 102 so that the fuel injector 202 need not supply twice the amount of the fuel as the injector 201 under this running condition.

With the embodiment of FIG. 10, on the other hand, the minimum ratio between the injectors 201 and 202 is equal at about 1.5 to 1.5 while at maximum running the ratio is 1 to 2 because of the more open communication of the injectors 201 and 202 with each other through the common passageway 252.

It should be readily apparent from the foregoing description that the described embodiments of the invention provide a relatively simple yet effective porting arrangement for a three intake valve engine wherein the performance will be maximized throughout the entire engine speed and load ranges and there will be good fuel distribution under all running conditions without excess fuel consumption. Of course, the foregoing description is that of preferred embodiments of the invention and various changes and modifications may be made without departing from the spirit and scope of the invention, as defined by the appended claims.

We claim:

1. An intake port arrangement for a cylinder head of an internal combustion engine, said cylinder head defining a combustion and at least three intake valve seats in said combustion chamber, a pair of separate inlet openings in an outer surface of said cylinder head, a first intake passage formed in said cylinder head extending from one of said inlet openings to a first of said valve seats, a second intake passage formed in said cylinder head extending from the other of said inlet openings to second and third valve seats, and means in said cylinder head for communicating said intake passages with each other adjacent said valve seats.

2. An intake port arrangement as set forth in claim 1 wherein the second intake passage is bifurcated.

3. An intake port arrangement as set forth in claim 1 wherein the first intake passage and the portion of the second intake passage serving the third valve seat extends substantially parallel to each other.

4. An intake port arrangement as set forth in claim 3 wherein the portion of the second intake passage extending to the second valve seat is disposed at an acute angle to the portion of the second passage extending to the third intake valve seat.

5. An intake port arrangement as set forth in claim 4 wherein the means for communicating the inlet passages with each other comprises a passage extending at an acute angle to the first portion of the second intake passage and intersecting the first intake passage.

6. An intake port arrangement as set forth in claim 5 wherein the communicating passageway is formed by a drilling operation performed through the first inlet opening.

7. An intake port arrangement as set forth in claim 1 further including first and second charge forming means for supplying a charge to the first and second intake passages, respectively.

8. An intake port arrangement as set forth in claim 7 wherein the first and second charge formers are operated in a staged sequence so that only the first charge former supplies fuel under low speed running conditions and both of the charge formers supply fuel under high speed running conditions.

9. An intake port arrangement as set forth in claim 8 wherein the valve seats each have the same effective cross sectional area and the cross sectional flow area of the second intake passage is approximately equal to twice the effective cross sectional area of the first intake passage.

10. An intake port arrangement as set forth in claim 9 wherein the fuel supplied by the first and second charge formers is in the ratio of one to two at the low mid-range end of the performance.

11. An intake port arrangement as set forth in claim 10 wherein the ratio of fuel supplied by the first and second charge formers at maximum performance is approximately equal to 1.2 to 1.8.

12. An intake port arrangement as set forth in claim 11 wherein the second intake passage is bifurcated.

13. An intake port arrangement as set forth in claim 12 wherein the first intake passage and the portion of the second intake passage serving the third valve seat extends substantially parallel to each other.

14. An intake port arrangement as set forth in claim 13 wherein the portion of the second intake passage extending to the second valve seat is disposed at an acute angle to the portion of the second passage extending to the third intake valve seat.

15. An intake port arrangement as set forth in claim 14 wherein the means for communicating the inlet passages with each other comprises a passage extending at an acute angle to the first portion of the second intake passage and intersecting the first intake passage.

16. An intake port arrangement as set forth in claim 15 wherein the communicating passageway is formed by a drilling operation performed through the first inlet opening.

17. An intake port arrangement as set forth in claim 7 wherein the first and second charge formers comprise respective first and second fuel injectors.

18. An intake port arrangement as set forth in claim 17 wherein the first and second fuel injectors are operated in a staged sequence so that only the first fuel injector supplies fuel under low speed running conditions and both of the fuel injectors supply fuel under high speed running conditions.

19. An intake port arrangement as set forth in claim 18 wherein the ratio of fuel supplied by the first and second fuel injectors is in the ratio of one to two at the low mid-range end of the performance.

20. An intake port arrangement as set forth in claim 19 wherein the ratio of fuel supplied by the first and second fuel injectors formers at maximum performance is approximately equal to 1.2 to 1.8.

21. An intake port arrangement and charge forming system for a cylinder head of an internal combustion engine, said cylinder head defining a combustion chamber and at least three intake valve seats in said combustion chamber, a first intake passage formed in said cylinder head and terminating at first of said valve seats, a second intake passage formed in said cylinder head and terminating at said second and said third valve seats, a first fuel injector for spraying fuel into said first intake passage and a second fuel injector for spraying fuel into said second intake passage.

22. An intake port arrangement as set forth in claim 21 wherein the first and second fuel injectors are operated in a staged sequence so that only the first fuel injector supplies fuel under low speed running conditions and both of the fuel injectors supply fuel under high speed running conditions.

23. An intake port arrangement as set forth in claim 22 wherein the valve seats each have the same effective cross sectional area and the cross sectional flow area of the second intake passage is approximately equal to twice the effective cross sectional area of the first intake passage.

24. An intake port arrangement as set forth in claim 23 wherein the fuel supplied by the first and second fuel injectors is the ratio of one to two at the low mid-range end of the performance.

25. An intake port arrangement as set forth in claim 24 wherein the ratio of fuel supplied by the first and second fuel injectors at maximum performance is approximately equal to 1.2 to 1.8.

* * * * *